United States Patent Office 3,426,105
Patented Feb. 4, 1969

3,426,105
COMPOSITIONS OF POLYPROPYLENE AND A COPOLYMER OF ETHYLENE AND BUTENE
Ralph E. Christensen, Bound Brook, N.J., assignor to Union Carbide Corporation, a corporation of New York
No Drawing. Filed Sept. 20, 1961, Ser. No. 139,380
U.S. Cl. 260—897  1 Claim
Int.Cl. C08f 29/02; B29c 5/06

ABSTRACT OF THE DISCLOSURE

This invention relates to a composition suitable for use in the manufacture of blow-molded articles comprising a polypropylene having a density of from about .903 to about .915 and a melt index of from about 0.04 to about 2, and a copolymer consisting of ethylene and 1-butene containing from about 0.5 to about 5 percent combined 1-butene.

---

This invention relates to compositions of ethylene-butene copolymers. More specifically, this invention relates to compositions of polypropylene and copolymers of ethylene and 1-butene which have particularly utility for use in the manufacture of blow-molded articles such as blow-molded containers characterized by excellent toughness, excellent stiffness, excellent resistance to environmental stress-cracking and which are also characterized by freedom of undesirable roughness or ridges on their exterior surface.

Olefinic homopolymers, as for example, polyethylene, which is otherwise desirable as a material from which is manufactured blow-molded articles, such as blow-molded containers, having excellent stiffness over a wide range of temperatures and exhibiting chemical inertness toward aqueous and non-aqueous liquids, has been found deficient in that blow-molded articles manufactured therefrom are susceptible to environmental stress-cracking. That is, blow-molded polyethylene articles have a tendency to crack and rupture when subjected to stress in the presence of certain environments. As an illustration, cracking of polyethylene containers has been found to occur in those instances wherein the container is subjected to a stress in the presence of surface active agents such as soaps and detergents; also in the presence of alcohols, polyglycol ethers, silicone fluids and various aliphatic and aromatic hydrocarbons.

In order to improve the stress-crack resistance of olefinic polymers, for instance ethylene polymers, it has been proposed to copolymerize ethylene with butene. The copolymers, however, are considerably less "stiff" than polyethylene and blow-molded containers manufactured from these copolymers require more material than the homopolymer to attain the necessary level of stiffness which is required for filling and for capping of these containers. Thin walled containers manufactured from these copolymers do not have the requisite resistance to handling and as a result are subject to undesirable deformation. In addition, on extruding these copolymers into parisons from which blow-molded containers are formed, the parisons are subject to "melt fracture." Melt fracture is evidenced by a pattern of roughness on the exterior surface of the parison, commonly referred to as "orange peel" or "alligator skin," which is carried over to the final product and detracts from its aesthetic appearance. In extreme cases, this roughness takes on the form of decided ridges.

It has now been found that on admixing polypropylene, which by itself lacks the necessary toughness to be used in the manufacture of certain blow-molded articles, with a copolymer of ethylene and butene that a composition is obtained from which tough blow-molded containers can be manufactured, with less material than would be required if the copolymer were used alone, which are resistant to deformation and are of sufficient stiffness to be filled and capped properly. Furthermore, containers formed from the compositions of this invention have excellent resistance to stress-cracking and as an additional feature, the compositions of this invention do not suffer any significant "melt fracture" on being extruded into parisons.

The compositions of this invention comprise a mixture of polypropylene and a copolymer of ethylene and 1-butene wherein the polypropylene is present in the compositions in an amount of from about 1 percent by weight to about 40 percent by weight, and preferably from about 10 percent by weight to about 30 percent by weight, based on the combined weight of the polypropylene and the copolymer of ethylene and 1-butene.

The ethylene-butene copolymers which are suitable for purposes of this invention are those containing from about 0.5 percent by weight to about 5 percent by weight, and preferably from about 0.5 percent by weight to about 2 percent by weight combined 1-butene. These copolymers are solids at room temperature, about 23° C., have a density in the range of from about 0.945 to about 0.955 gram per cubic centimeter at 23° C., and have a melt index of from about 0.05 to about 0.5 decigram per minute.

Polypropylenes, which are admixed with copolymers of ethylene and 1-butene to provide the compositions of this invention, are solids at room temperature, about 23° C. Suitable polypropylenes have a density in the range of from about 0.903 to about 0.915 gram per cubic centimeter at 23° C., and have a melt index of from about 0.04 to about 2.0 decigrams per minute.

The addition of polypropylene to the ethylene-butene copolymers can be accomplished in any convenient manner so long as there is attained a thorough admixture of the two materials. For example, the materials can be admixed together in a 2-roll mill, Banbury mill, an extruder and the like.

If desired, the compositions of this invention can also contain various additives, for example to plasticize, to stabilize, to lubricate, to prevent oxidation and to lend color to the compositions. Such additives are well-known and can be added to the compositions of this invention in convenient amounts, as is known by those skilled in the art. Illustrative of such additives are substituted phenols, thio bisphenols, aromatic amines, dyes, pigments, carbon black, ultra-violet light absorbents, fatty acid amides, waxes, clays, alkaline earth carbonates, rubber and the like.

The ethylene-butene copolymer compositions of this invention were formulated, tested and compared with unmodified ethylene-1-butane copolymers and unmodified polypropylene. The methods of formulation, tests and test results are noted below. It is to be pointed out that the test results clearly indicate the high degree of stiffness, toughness, and resistance to stress-cracking possessed by the compositions of this invention as well as indicating their resistivity to "melt fracture."

Each of the compositions noted in Examples I, II and III were admixed in either a Banbury mill (Example 1) or a double screw extruder (Welding Engineer's Extruder, Examples II and III). Six ounce bottles were molded on a laboratory three ounce ram extrusion blow molding machine having a die with a diameter of 0.500 inch and straight land length of 3 inches and provided with a 0.375 inch pin with a straight land of three inches in length, i.e., a three-inch land of constant cross-sectional area leading to the die opening. The bottles were molded at a stock temperature of about 200° C. and at an extrusion rate such as to produce an average wall thickness of .020 inch.

Bottles from which "melt fracture" was evaluated were blow-molded from a similar machine, this machine having a die, with a diameter of 0.400 inch and a straight land length of 0.750 inch, and provided with a pin of 0.340 inch which tapered 8 degrees to the die opening.

The bottles were then used in various test procedures which are described below:

STRESS-CRACK RESISTANCE

Ten bottles were filled and capped with 25 cc. of "Igepal" which is a liquid detergent consisting essentially of iso-octyl phenoxy polyoxyethylene ethanol. The bottles were then placed on a wire mesh supported on a suitable tray and the entire assembly was placed in a circulating air oven where the temperature was maintained at 70° C. Observations were made every four hours for the first twenty-four hours, every eight hours for the next six days and every twenty-four hours after the first week until $F_0$ and $F_{50}$ were reached. $F_0$ is defined as the time in hours at which the first bottle failed and $F_{50}$ is the time in hours at which half of the bottles failed. The first observed crack which caused detergent to leak out constituted a bottle failure.

MELT FRACTURE

Melt fracture determinations were made by a panel of three persons comparing three bottles made from each of the compositions of Example III to standards 1 (no melt fracture) through 5 (extreme melt fracture—ridges in the final product.)

TOUGHNESS

The purpose of this test was to determine the toughness of blow-molded bottles under various temperature conditions. Five bottles were filled with water and capped for testing at 23° C., and five other bottles were filled with salt water and capped for testing at 0° C. Each of the bottles remained standing at the specified temperature for twenty-four hours. After conditioning, the bottles were dropped on their bottoms, starting from a ten inch height, then increasing the drop height in ten-inch intervals until failure occurred, i.e., bursting of the bottle. The average of five heights at which failure occurred was reported in inches and indicated "toughness."

Physical properties of the compositions were determined by the test procedures noted below:

Melt index, ASTM D-1238-52T; density, ASTM D-792-50(A); secant modulus, p.s.i. at 1% elongation—ASTM D-638-56T.

The following examples are illustrative.

Example I

Composition A.—Twenty-five parts by weight of polypropylene having a melt index of 0.46 and a density of 0.907.

Seventy-five parts by weight of an ethylene-butene copolymer containing about 1 percent by weight combined 1-butene, and having a melt index of 0.25 and a density of 0.947.

Control I: Ethylene-butene copolymer containing about 1 percent by weight combined 1-butene and having a melt index of 0.25 and a density of 0.947.

Control II: Polypropylene having a melt index of 0.46 and a density of 0.907.

|  | Control I | Composition A |
|---|---|---|
| Melt index | 0.25 | 0.61 |
| Density | 0.947 | |
| Secant modulus, p.s.i. | 90,000 | 106,000 |
| Stress-crack resistance at— | | |
| 70° C., $F_0$ hrs | 16 | 56 |
| 70° C., $F_{50}$ hrs | 32 | 112 |

The toughness of Composition A was determined and compared to the toughness of Control II. The results of the test are indicated below:

|  | Control II | Composition A |
|---|---|---|
| Toughness at— | | |
| 23° C., inches | 30 | 120 |
| 0° C., inches | 10 | 50 |

Example II

Composition B.—Twenty parts by weight of a polypropylene having a melt index of 0.04 and a density of 0.903.

Eighty parts by weight of an ethylene-butene copolymer containing about 1 percent by weight combined 1-butene and having a melt index of 0.31 and a density of 0.952.

Composition C.—Twenty parts by weight of a polypropylene having a melt index of 1.30 and a density of 0.909.

Eighty parts by weight of an ethylene-butene copolymer described in Composition B.

Composition D.—Twenty-five parts by weight of a polypropylene described in Composition C.

Seventy-five parts by weight of an ethylene-butene copolymer described in Composition B.

Composition E.—Thirty parts by weight of a polypropylene described in Composition C.

Seventy parts by weight of an ethylene-butene copolymer described in Composition B.

Control III: Ethylene-butene copolymer containing about 1 percent combined 1-butene and having a melt index of 0.31 and a density of 0.952.

Control IV: Polypropylene having a melt index of 0.04 and a density of 0.903.

Control V: Polypropylene having a melt index of 1.30 and a density of 0.909.

|  | Control III | Compositions | | | |
|---|---|---|---|---|---|
|  |  | B | C | D | E |
| Melt index | 0.31 | 0.05 | 0.44 | 0.61 | 0.56 |
| Density | 0.952 | 0.946 | 0.945 | 0.938 | 0.935 |
| Secant modulus, p.s.i. | 102,000 | 107,000 | 122,000 | 130,000 | 140,000 |
| Stress-crack resistance at— | | | | | |
| 70° C., $F_0$ hrs | 20 | 64 | 32 |  | 35 |
| 70° C., $F_{50}$ hrs | 20 | 72 | 40 | 40 | 59 |

The toughness of Compositions B through D were determined and compared to the toughness of Controls IV and V. The results of the test are indicated below:

| Toughness at— | Control IV | Control V | B | C | B |
|---|---|---|---|---|---|
| 23° C., inches | 40 | 40 | 130 | 120 | 90 |
| 0° C., inches | 15 | 10 | 120 | 90 | 80 |

The tabulated results of Examples I and II clearly show the increased stiffness, indicated by the secant modulus, increased stress-crack resistance of the compositions of this invention over those of the copolymer alone, and the high degree of toughness of the compositions of this invention over polypropylene alone.

A composition containing 70 parts by weight of polypropylene and 30 parts by weight of an ethylene-butene copolymer was prepared in the same manner as composition C. Bottles blow-molded from this composition were tested for toughness and were found to fail at a height of 10 inches at 0° C., illustrating the fact that when polypropylene is admixed with an ethylene-butene copolymer in a greater proportion than is perscribed by this invention, a degradation in toughness is observed.

Example III

A polypropylene having a melt index of 1.55 and a density of 0.909, and an ethylene-butene copolymer containing about 1 percent by weight combined 1-butene and having a melt index of 0.28 and a density of 0.952, were admixed in various proportions in a Welding Engineers' Extruder. Bottles formed from these compositions were examined for "melt fracture."

Control VI: Ethylene-butene copolymer containing about 1 percent by weight combined 1-butene and having a melt index of 0.28 and a density of 0.952.

|  | Control VI | Composition F | Composition G |
|---|---|---|---|
| Polypropylene, parts by weight | | 10 | 15 |
| Ethylene-butene copolymer, parts by weight | 100 | 90 | 85 |
| Melt index | 0.28 | 0.32 | 0.40 |
| Melt fracture | [1] 4 | [2] 2 | [3] 1 |

[1] Poor.
[2] Very good.
[3] Excellent.

The tabulated results clearly indicate that the compositions of this invention are relatively free of "melt fracture."

What is claimed is:

1. Composition suitable for use in the manufacture of blow-molded articles characterized by excellent toughness, excellent stiffness, excellent resistance to environmental stress-cracking and freedom from extrusion melt fracture comprising a normally solid polypropylene having a density of from about 0.903 to about 0.915 gram per cubic centimeter at 23° C. and a melt index of from about 0.04 to about 2.0 decigrams per minute and a copolymer consisting of ethylene and 1-butene having a density in the range of from about 0.945 to about 0.955 gram per cubic centimeter at 23° C., a melt index of from about 0.05 to about 0.5 decigram per minute, and containing from about 0.5 to about 5 percent combined 1-butene, said composition containing from about 1 to about 40 percent by weight of said polypropylene based on the combined weight of said polypropylene and said copolymer.

References Cited

UNITED STATES PATENTS

| 2,993,876 | 7/1961 | McGlamery | 260—897 |
| 3,036,987 | 5/1962 | Ranalli | 260—897 |
| 3,004,020 | 10/1961 | Young et al. | 260—897 |
| 3,074,616 | 1/1963 | Martinovich et al. | 260—897 |
| 3,086,958 | 4/1963 | Canterino et al. | 260—897 |
| 3,254,139 | 5/1966 | Anderson et al. | 260—897 |

FOREIGN PATENTS

| 602,151 | 7/1960 | Canada. |
| 1,179,502 | 11/1960 | France. |
| 830,827 | 3/1960 | Great Britain. |

SAMUEL H. BLECH, *Primary Examiner.*

C. J. SECCURO, *Assistant Examiner.*

U.S. Cl. X.R.

260—41, 28.5, 4, 32.6